United States Patent [19]

Wurst et al.

[11] 4,177,744
[45] Dec. 11, 1979

[54] DIGITAL OVERRIDE CONTROL OF BIGHT AND FEED IN A SEWING MACHINE

[75] Inventors: John W. Wurst, Dover; William H. Dunn, Branchville, both of N.J.

[73] Assignee: The Singer Company, New York, N.Y.

[21] Appl. No.: 928,940

[22] Filed: Jul. 28, 1978

[51] Int. Cl.$^2$ .............................................. D05B 3/02
[52] U.S. Cl. ................................................. 112/158 E
[58] Field of Search .......... 112/158 E, 121.11, 121.12; 318/567, 569

[56] References Cited

U.S. PATENT DOCUMENTS

| | | | |
|---|---|---|---|
| 3,977,338 | 8/1976 | Wurst et al. | 112/158 E X |
| 4,016,821 | 4/1977 | Minalga | 112/158 E |
| 4,116,144 | 9/1978 | Tanimoto et al. | 112/158 E |

*Primary Examiner*—Peter Nerbun

*Attorney, Agent, or Firm*—David L. Davis; Robert E. Smith; Edward L. Bell

[57] ABSTRACT

A sewing machine is disclosed wherein the positional coordinates for successive stitch penetrations are stored in a memory having addressable locations corresponding to a plurality of operator selectable patterns. Means are provided for operator initiation of an override command to selectively alter the operation of the feed and bight actuators to an amount of motion different from that dictated by the stored pattern information. An operator influenced control provides a digital signal corresponding to a desired alteration value. Override memory locations are provided for storing bight and feed actuator motion alteration values. These locations are addressed in accordance with the selected pattern and the digital override signal provided by the operator. The alteration values are utilized for control of the appropriate feed and bight actuators.

5 Claims, 7 Drawing Figures

FEED OVERRIDE DUTY CYCLE CODE TABLES

STORED REDUCTION

| DIGIT DISPLAYED | SET 0 | | SET 1 | | SET 2 | | SET 3 | |
|---|---|---|---|---|---|---|---|---|
| | STORED CODE | PERCENT OF FIXED STITCH LENGTH | STORED CODE | PERCENT OF FIXED STITCH LENGTH | STORED CODE | PERCENT OF FIXED STITCH LENGTH | STORED CODE | PERCENT OF FIXED STITCH LENGTH |
| 0 | 00110 | 21.9 | 01011 | 37.5 | 00101 | 18.8 | 00110 | 21.9 |
| 1 | 01000 | 28.1 | 01100 | 40.6 | 00110 | 21.9 | 00111 | 25.0 |
| 2 | 01011 | 37.5 | 01101 | 43.8 | 00111 | 25.0 | 01001 | 31.3 |
| 3 | 01101 | 43.8 | 01111 | 50.0 | 01000 | 28.1 | 01100 | 40.6 |
| 4 | 01111 | 50.0 | 10000 | 53.1 | 01001 | 31.3 | 01110 | 46.9 |
| 5 | 10010 | 59.4 | 10010 | 59.4 | 01010 | 34.4 | 10000 | 53.1 |
| 6 | 10110 | 71.9 | 10100 | 65.6 | 01011 | 37.5 | 10011 | 62.5 |
| 7 | 11001 | 81.3 | 10110 | 71.9 | 01101 | 43.8 | 10110 | 71.9 |
| 8 | 11100 | 90.6 | 11001 | 81.3 | 10010 | 59.4 | 11010 | 84.4 |
| 9 | 11111 | 100.0 | 11111 | 100.0 | 11111 | 100.0 | 11111 | 100.0 |

Fig. 3

FIXED FEED CODES

| FROM PATTERN ADDRESS ROM | STORED CODE | FIXED FEED (SPI) |
|---|---|---|
| 0 | USE STORED VALUES | |
| 1 | 00000 | 6.0 |
| 2 | 01001 | 12.7 |
| 3 | 01101 | 24.4 |

Fig. 4

BIGHT OVERRIDE DUTY CYCLE CODE TABLE

| OVERRIDE DIGIT DISPLAYED | STORED CODE | PERCENT OF FULL WIDTH |
|---|---|---|
| 0 | 00000 | 3.1 |
| 1 | 00100 | 15.6 |
| 2 | 01000 | 28.1 |
| 3 | 01100 | 40.6 |
| 4 | 01111 | 50.0 |
| 5 | 10011 | 62.5 |
| 6 | 10110 | 71.9 |
| 7 | 11001 | 81.3 |
| 8 | 11100 | 90.6 |
| 9 | 11111 | 100.0 |

Fig. 6

| PATTERN | STORED SET | FIXED FEED |
|---|---|---|
| (21) STRAIGHT STITCH | 0 | 1 |
| (22) ZIG-ZAG | 2 | 2 |
| (23) RIC-RAC | 0 | 0 |
| (24) LEFT ZIG-ZAG | 2 | 2 |
| (25) MULTISTITCH ZIG-ZAG | 3 | 3 |
| (26) BASTE | 0 | 2 |
| (27) MAXISTRETCH | 0 | 0 |
| (28) BLIND STITCH | 0 | 1 |
| (29) ZIG-ZAG BLIND | 0 | 1 |
| (30) LARGE BUTTONHOLE | 1 | 0 |
| (31) SMALL BUTTONHOLE | 1 | 0 |
| (32) TAILOR TACK | 0 | 2 |
| (33) SOLID CRESCENT | 1 | 3 |
| (34) SCALLOP | 0 | 2 |
| (35) SERPENTINE | 0 | 2 |
| (36) M STITCH | 1 | 3 |
| (37) OVEREDGE | 0 | 0 |
| (38) FEATHER | 0 | 0 |
| (39) PARIS POINT | 0 | 0 |
| (40) BLANKET | 0 | 0 |
| (41) LEAF | 0 | 0 |
| (42) RIBBON | 1 | 3 |
| (43) ARROWHEAD | 1 | 3 |
| (44) ICICLE | 1 | 3 |
| (45) TURKISH HEM | 0 | 0 |
| (46) HONEYCOMB | 0 | 0 |
| (47) LACE | 0 | 0 |
| (48) HEART | 0 | 0 |
| (49) TRAIN | 0 | 0 |

Fig. 5

DIGITAL OVERRIDE CONTROL OF BIGHT AND FEED IN A SEWING MACHINE

DESCRIPTION

BACKGROUND OF THE INVENTION

This invention relates to sewing machines and, more particularly, to sewing machines having positional coordinates for successive stitch penetrations stored in a memory. Specifically, this invention relates to the alteration of such positional coordinates, under operator command, during the transmission of such coordinates to the stitch forming instrumentality positioners.

A system is disclosed in U.S. Pat. No. 4,016,821, issued on Apr. 12, 1977, wherein logic circuitry is used to select and release stitch information stored in a memory in timed relation with the operation of a sewing machine. Digital information from the memory is converted to positional analog signals which control closed loop servo systems including moving coil linear actuators directly controlling the position of conventional stitch forming instrumentalities of the sewing machine to reproduce a pattern of stitches corresponding to the selected stitch information. According to the system disclosed in the referenced patent, circuitry is provided which permits an operator to alter the stored bight and feed motions. Operator influenced means are effective to signal the logic circuitry to selectively apply a holding signal to an FET switch, maintaining the FET switch in the conductive state. Closing of this FET switch inserts the wiper of a potentiometer in bypass arrangement in the feedback circuit of an operational amplifier interposed between a digital to analog converter for feed or bight and, respectively, the feed or bight servo system. By changing the magnitude of the resistance in the feedback circuit of the operational amplifier, the gain of the amplifier may be selectively reduced, thereby controlling the signal to the feed or bight linear actuator for selective reduction of stitch length or pattern width, respectively.

While the system described above, as disclosed in the aforereferenced U.S. Patent, performs satisfactorily, the disclosed override control is an analog function added to a system which is otherwise digitally controlled. It is therefore an object of the present invention to provide digital override feed and bight controls for a stored pattern sewing machine.

When utilizing digital controls for the override functions, only a limited number of discrete override values are obtainable. This is an inherent limitation of a digital system. The limited set of discrete override values for one particular pattern may not be suitable as override values for another particular pattern. It is therefore another object of this invention to provide a plurality of sets of discrete override values, with the particular selected pattern determining which set of override values is utilized.

A limitation of the override system disclosed in the abovereferenced patent is that the only override control is the amount of reduction in gain which may be achieved. It is possible that rather than a reduction in gain, an increase in gain may be desired. For example, it may be desirable to increase the stitch length in a particular pattern above the stored stitch length. It is therefore a further object of this invention to provide an override amplification capability.

SUMMARY OF THE INVENTION

The foregoing and additional objects are attained in accordance with the principles of this invention in a sewing machine having stitch forming instrumentalities positionally controlled over a predetermined range between stitches to produce a pattern of feed and bight controlled stitches, static memory means for storing pattern stitch information, means operating in timed relation with the sewing machine for recovering selected pattern stitch information from the static memory means, separate actuating means responsive to the pattern stitch information for influencing the feed and bight motions respectively to produce a pattern of stitches corresponding to the selected pattern stitch information, and controllable alteration means effective to alter the operation of at least one of the feed and bight actuating means to an amount of motion different from that dictated by the pattern stitch information, by providing override memory means for storing bight and feed actuating means motion alteration values in addressable memory locations, operator controlled means for providing an address signal corresponding to a desired alteration value, means utilizing the address signal for retrieving from the override memory means the desired alteration value, and converting means for converting the desired alteration value into a control signal for rendering effective the alteration means.

In accordance with an aspect of this invention, each alteration means includes digital to analog converter means for generating a positional analog signal related to the selected pattern stitch information, each actuating means includes closed loop servo means including a reversible electric motor responsive to the positional analog signal for positioning the respective stitch forming instrumentality, the alteration means further includes an operational amplifier interposed between the digital to analog converter means and the closed loop servo means, the operational amplifier having a feedback circuit including a fixed resistor and controllable switch means connected across the resistor, the converting means includes means for controlling the switch means to selectively short circuit the resistor at a controlled rate to effect a controlled gain reduction for the operational amplifier, and the override memory means stores signals corresponding to the controlled rate.

In accordance with a further aspect of this invention, the override memory means storing feed alteration values includes a plurality of tables of controlled rates, the selected table being determined according to the selected pattern.

In accordance with another aspect of this invention, the override memory means storing feed alteration values further includes means for storing fixed feed information which is substituted for the stored pattern feed information.

BRIEF DESCRIPTION OF THE DRAWINGS

The foregoing will be more readily apparent upon reading the following description in conjunction with the drawing in which:

FIG. 3 shows illustrative feed override duty cycle code tables showing digital values and percent reduction values for the different override digits, which tables are utilized with the circuitry shown in FIGS. 2A and 2B;

FIG. 4 shows a fixed feed code table stored in memory and utilized with the circuitry of FIGS. 2A and 2B;

FIG. 5 is a table showing for each pattern of the sewing machine of FIG. 1 which stored set of FIG. 3 and which fixed feed of FIG. 4 is utilized; and FIG. 6 shows an illustrative bight override duty cycle code table stored in memory showing the stored digital code and the percentage of full width for the different override digits, which table may be utilized with the circuitry of FIGS. 2A and 2B.

DETAILED DESCRIPTION

Figure 1:
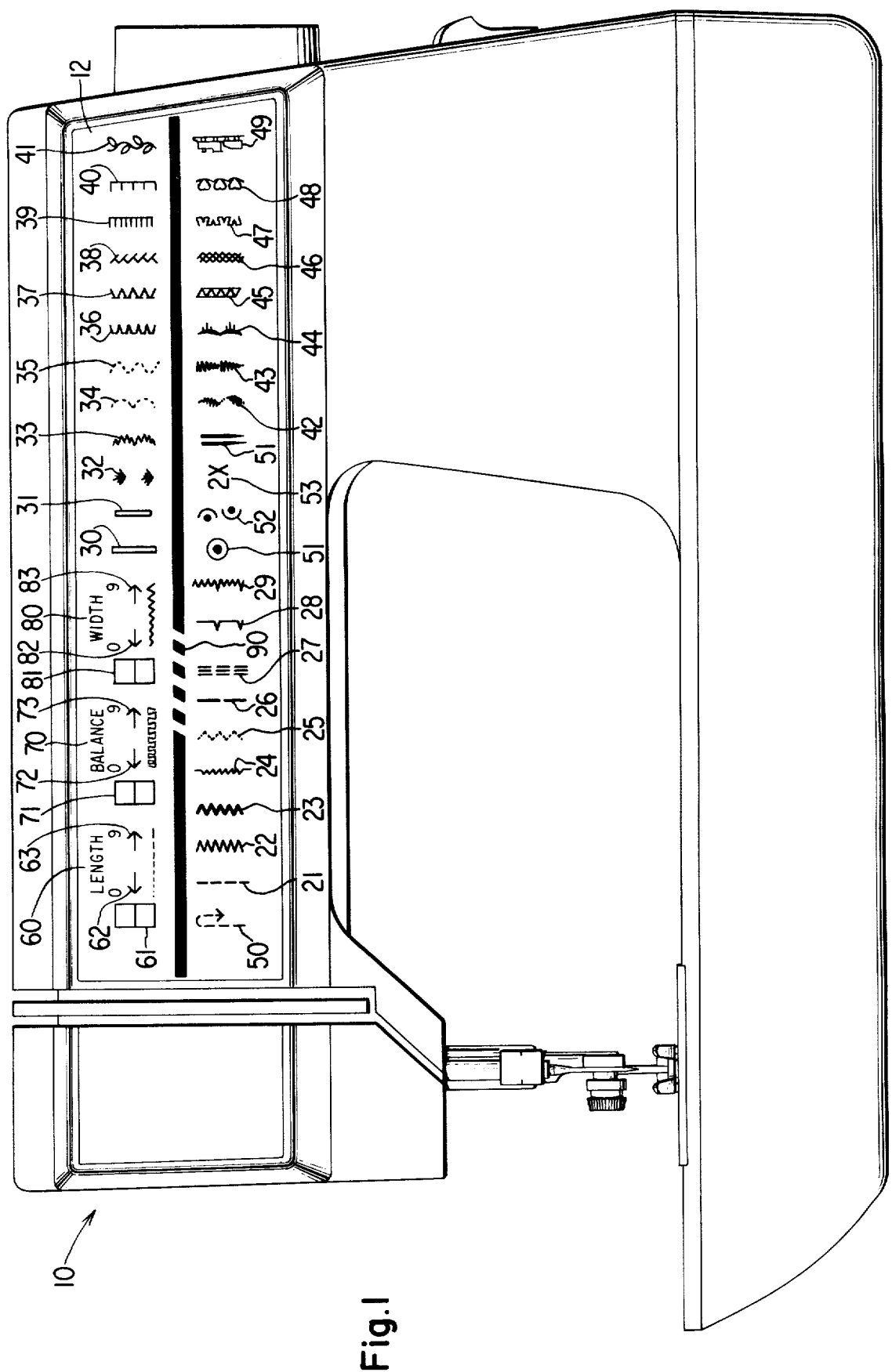
FIG. 1 is a front elevation of a sewing machine in which an arrangement constructed in accordance with the principles of this invention may be incorporated.

Referring to the drawing, FIG. 1 illustrates a sewing machine indicated generally at 10 having a control panel 12 illustratively of the type utilizing a continuous planar element such as a glass panel to which circuitry is applied as by deposition or the like to provide controls sensitive to the touch of an operator's finger. Indicated at 21-49 are touch sensitive areas having respective representations of various stitch patterns which may be automatically sewn by the sewing machine 10. The names of these patterns 21-49 are set forth in the table of FIG. 5. For an understanding of the manner in which automatic pattern sewing may be accomplished, the reader is referred to U.S. Pat. No. 3,872,808, issued to John W. Wurst on Mar. 25, 1975, the disclosure of which is hereby incorporated by reference.

In addition to the pattern representations, the control panel 12 includes a representation 50 for backtack, or reverse stitching, a representation 51 for single pattern execution, a representation 52 for the mirror image of a pattern, a representation 53 for doubling the length of the pattern, and a representation 54 for usage of the machine 10 with twin needles.

Further, the control panel 12 has thereon areas which may be touched by an operator to override the stored values for controlling stitch length and width. In particular, an area of control panel 12 denoted generally by the reference numeral 60 is provided for controlling the stitch length; an area of the control panel 12 denoted generally by the reference numeral 70 is provided for controlling feed balance in patterns having both forward and reverse feed; and an area of the control panel 12 denoted generally by the reference numeral 80 is provided for controlling stitch width in bight controlled patterns. The present invention is concerned with the length and width controls. The length override touch area 60 includes a seven segment numeric display area 61, a decreasing stitch length touch area denoted by a leftward facing arrow 62 and an increasing stitch length touch area denoted by a rightward facing arrow 63. Similarly, the width override control area 80 includes a seven segment numeric display area 81, a decreasing stitch width touch area denoted by a leftward facing arrow 82 and an increasing stitch width touch area denoted by a rightward facing arrow 83. The balance override area 70 is similarly constructed but as such forms no part of the present invention, no further description thereof will be given herein. A touch area denoted by the broken line segments 90 is provided for enabling the override controls. It will be appreciated that this invention also has application to control panels which include a plurality of push button operated switches or any other switching arrangement, and is not intended to be limited to use with a touch sensitive control panel, which is depicted herein for illustrative purposes.

Figure 2A:
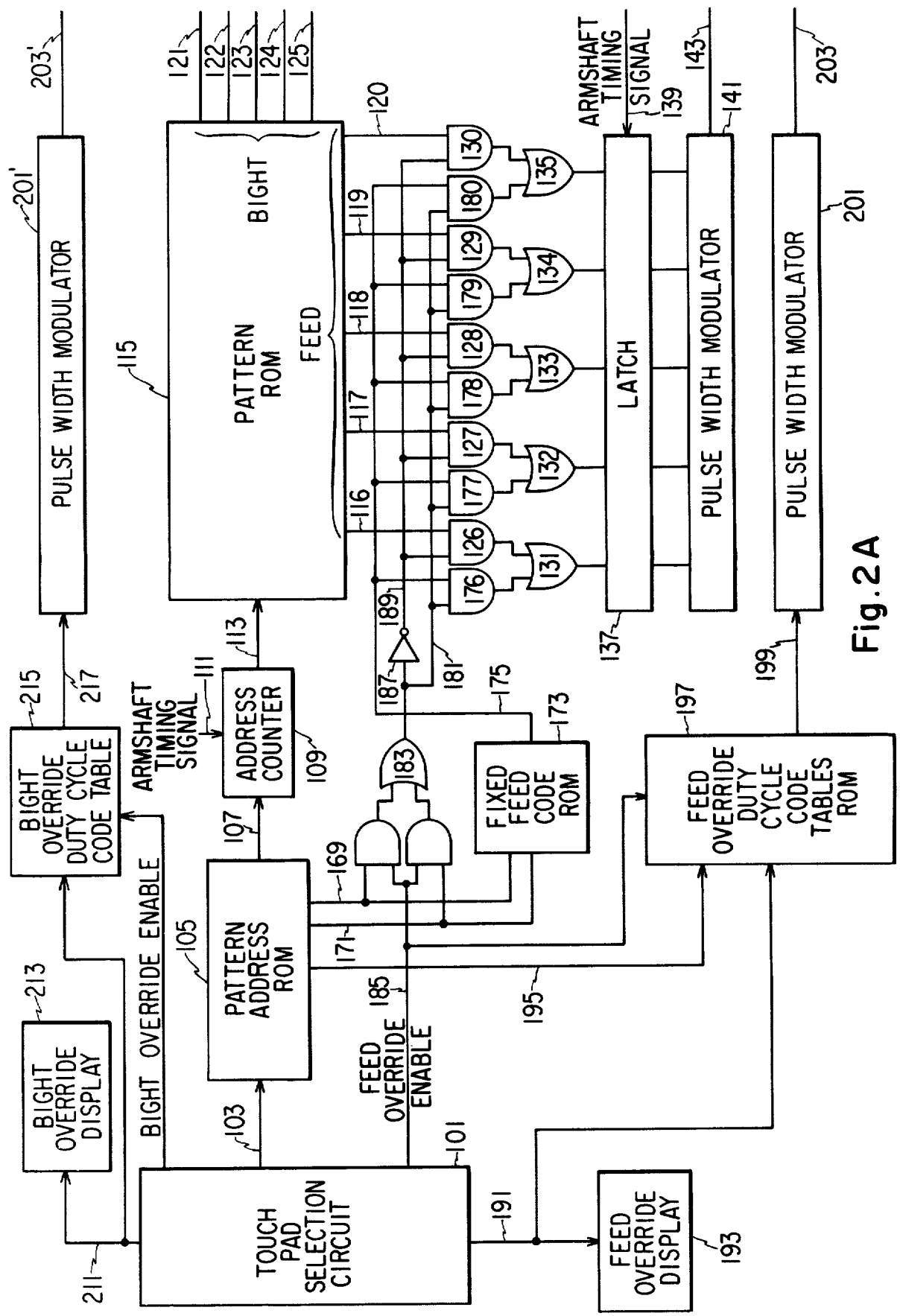
FIGS. 2A and 2B, with FIG. 2A placed to left of FIG. 2B, together form a block schematic diagram of illustrative circuitry constructed in accordance with the principles of this invention.
Figure 2B:
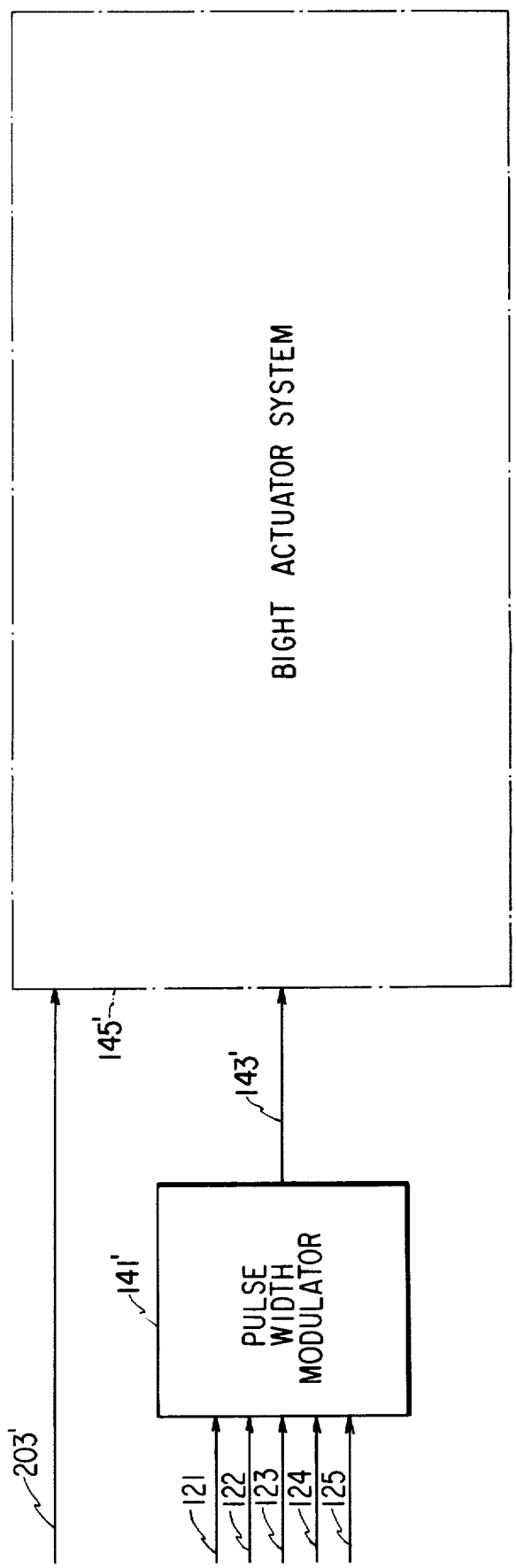
Figure 2B:
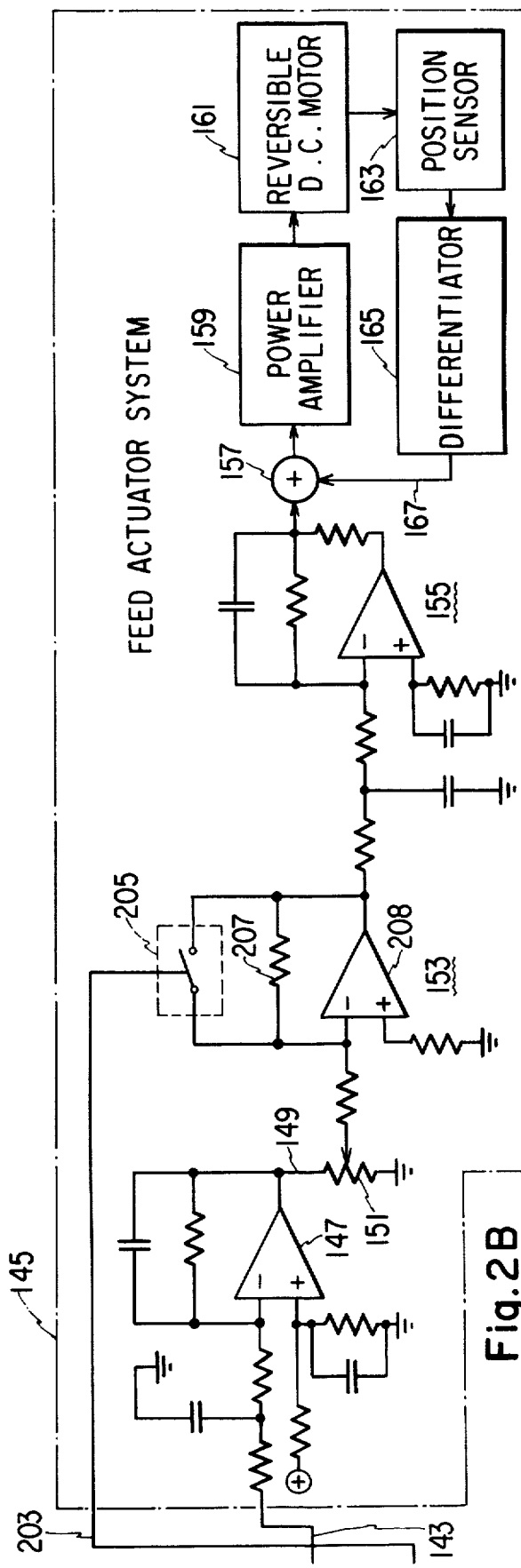

Referring now to FIGS. 2A and 2B, the circuitry shown therein is responsive to an operator's finger touching selected areas of the control panel 12 for controlling the operation of the sewing machine 10 to form stitches in a selected pattern in accordance with information stored in a memory and further to vary the appearance of the selected pattern in accordance with desired operator initiated override functions of the stitch width and length. For an explanation of the manner in which control signals may be generated in response to an operator's finger touching a selected area, the reader is referred to U.S. Pat. Appl. Ser. No. 882,006, filed Feb. 28, 1978, and assigned to the assignee of the present invention, the disclosure of which application is hereby incorporated by reference. Circuitry for generating such touch initiated control signals is represented in FIG. 2A by the block 101 labeled Touch Pad Selection Circuit. In accordance with the teachings of the above referenced U.S. patent application and the above referenced U.S. Pat. No. 3,872,808, the touch of a selected pattern area 21-49 causes an appropriate pattern selector code word to be provided by the Touch Pad Selection Circuit 101 on the leads 103 to the pattern address ROM 105. In accordance with the teachings of the above referenced U.S. Pat. No. 3,872,808, the pattern address ROM 105 provides over the leads 107 to the address counter 109 a code word representing the selected pattern. This code word on the leads 107 determines the starting point of the address counter 109 which has a count up input line 111 upon which are provided pulses from the arm shaft pulse generator (not shown). The address counter 109 has output leads 113 which are connected to the inputs of a pattern ROM 115. Although a counter 109 has been shown, it is apparent that any other sequence generator may be utilized so long as the sequence generator may be initialized to some point in its sequence by the code applied thereto over the leads 107, and thereafter generates a predetermined sequence of output codes over the leads 113 in response to input pulses on the lead 111. Such a sequence generator may be, for example, a shift register with hard wired feedback, as is known in the art.

The pattern ROM 115 has output lines 116, 117, 118, 119 and 120 which provide a digital code word for the feed actuator system and output lines 121, 122, 123, 124 and 125 which provide a digital code word for the bight actuator system. The feed and bight actuator system are similar in construction and are adapted to convert a digital code word from the pattern ROM 115 into a mechanical position which locates the sewing machine needle in a conventional stitch forming instrumentality and provides a specific work feed for each needle penetration, as described in the above referenced U.S. Pat. No. 3,872,808.

As will be described in more detail hereinafter, the outputs of the pattern ROM 115 are presented as inputs to respective pulse width modulators which, in cooperation with appropriate output filtering, provide respective analog signals for controlling the respective bight and feed actuators. The following discussion will describe in detail the operation of the feed actuator system and its related override controls. When referring to the bight actuator system, elements therein corresponding to identical elements in the feed actuator system will be designated with the same reference number as in the feed actuator system except that the numbers associated with the bight actuator system are primed.

Assuming for the time being that the sewing machine operator has not initiated an override command, the feed information bits on the leads 116-120 from the pattern ROM 115 pass through the AND gates 126-130 and through the OR gates 131-135 to the latch 137 which holds the information until an appropriate time is signalled by a pulse on the lead 139 from the arm shaft pulse generator (not shown). At this time the signals are presented to a pulse width modulator 141. The output of the pulse width modulator 141 on the lead 143 is a high frequency digital signal having an ON/OFF duty cycle controlled by the binary number of the input to the pulse width modulator 141 from the latch 139, in a manner well known in the art. For example, if the binary number on the leads 116-120 is 01100, equivalent to the decimal number 12, the duty cycle of the signal on the lead 143 will be 13/32.

The duty cycle controlled signal on the lead 143 is presented as an input to the feed actuator system 145. The input stage of the feed actuator system 145 including the operational amplifier 147 functions as a combined filter and digital to analog converter to provide a signal on the lead 149 which is a substantially DC level having a magnitude and polarity depending upon the duty cycle of the signal on the lead 143. This signal on the lead 149 is coupled through a factory adjustable potentiometer 151 to the input of a preamplifier stage 153 and then through another filtering stage 155 to a summing junction 157 which is the input to a closed loop servo system. This closed loop servo system is illustratively of the type disclosed in U.S. Pat. No. 3,984,745, issued on Oct. 5, 1976, the disclosure of which is hereby incorporated by reference herein. The closed loop servo system includes a power amplifier 159 which supplies direct current of reversible polarity to an electromechanical actuator 161, which in the broadest sense comprises a reversible DC motor, to position the actuator 161 in accordance with the input signal on the line 143. A feedback position sensor 163 mechanically connected to the reversible motor 161 provides a feedback position signal which is differentiated with respect to time in a differentiator 165 and the resulting rate signal is presented on the line 167 to the summing junction 157 of the power amplifier 159 to modify the positional signal at that point. The position sensor 163 may be any device that generates an analog voltage proportional to position and may, illustratively, be a simple linear potentiometer connected to a stable reference voltage and functioning as a voltage divider. The differentiator 165 is preferably an operational amplifier connected to produce an output signal equal to the time rate of change of the input voltage, as is well known in the art. While the reversible motor 161 may be a conventional low inertia rotary DC motor, illustratively such motor takes the form of a linear actuator in which a lightweight coil moves linearly in a constant flux field and is directly coupled to the load to be positioned.

When an operator has selected one of the patterns 21-49 and desires to override, or change, the stored stitch length and/or width of the pattern, the override enable area 90 on the control panel 12 (FIG. 1) is touched. The Touch Pad Selection Circuit 101 contains internal logic circuitry responsive to this touch for performing certain functions. As the Touch Pad Selection Circuit 101 does not form a part of the present invention, these functions will only be briefly discussed.

The control panel 12 is preferably of a "dead front" form, that is, only those displays of instant concern to an operator are visible. Visibility is achieved through the use of lighting devices within the control panel 12. When the sewing machine 10 is initially turned on, or when a new pattern is selected, the only visible displays are the pattern representations 21-49, the backtack representation 50, the single pattern representation 51, the mirror image representation 52, the double stitch length representation 53 and the twin needle representation 54. The override areas 60, 70 and 80 remain dark. After an operator has selected one of the patterns 21-49 and desires to enable one or more override functions, the override enable area 90 is touched. Touch pad selection circuit 101 recognizes this and causes the override areas 60, 70 and 80 to be lit. However, the numeric displays 61, 71 and 81 remain dark at this time. For any given pattern 21-49, only certain of the override functions are available. For example, if a particular pattern does not include reverse feed, there is no balance control. Also, certain patterns do not have a width control such as, for example, the tailor tack pattern 32. The Touch Pad Selection Circuit 101 contains a table indicating for each pattern which of the three overrides may be enabled. If a particular override does not function for the selected pattern, the Touch Pad Selection Circuit 101 will ignore all touches on the arrows for that pattern. However, if the selected pattern can be overridden, after the override enable area 90 is touched and the operator touches one of the arrows for the selected override function, the respective numeric display will be lit. In accordance with the present invention, the width override is always a reduction in stitch width. Therefore, when one of the width arrows 82 or 83 is first touched, the width numeric display 81 will be initialized at a value of 9. Further in accordance with this invention, the length override may cause either a selective increase or decrease of stitch length. Therefore, as will be described in full detail hereinafter, initially the numeric display 61 will be at some intermediate value between 0 and 9 when one of the length arrows 62 or 63 is first touched.

The pattern address ROM 105, which contains the address of the first word of each sewing pattern stored in the pattern ROM 115, contains four additional bits for each pattern first word. Two of these bits appear on the leads 169 and 171 and are utilized to address the fixed feed code ROM 173 to choose one of three new fixed forward feed codes to "force" in place of the one in the main pattern ROM 115. The fourth combination of the two bits allows the data stored in the pattern ROM 115 to be used unaltered. Referring now to FIG. 4, depicted therein is a table showing the codes stored in fixed feed code ROM 173 and the fixed feed, expressed in stitches per inch, associated therewith. For example, if the bits on leads 169 and 171 are 00, the feed values stored in the pattern ROM 115 are utilized; if the bits on leads 169 and 171 are 01, a fixed feed of 6.0 stitches per inch is forced; if the bits on leads 169 and 171 are 10, a fixed feed of 12.7 stitches per inch is forced; and if the bits on leads 169 and 171 are 11, a fixed feed of 24.4 stitches per inch is forced. The table in FIG. 5 specifies for each of the patterns 21-49 which of the fixed feeds is utilized when the feed override is enabled for that pattern.

The fixed feed codes stored in the fixed feed code ROM 173 are applied to a five bit bus 175. Each bit on the bus 175 is applied to a respective one of the AND gates 176-180. The other input to each of the AND gates 176-180 is, over lead 181, the output of OR gate 183. The output of the OR gate 183 on the lead 181 is high whenever the Touch Pad Selection Circuit 101 recognizes a valid feed override request and places a high signal on feed override enable lead 185 and the bits on the leads 169 and 171 indicate that a forced fixed feed is to be obtained from the fixed feed code ROM 173. With a high signal on the lead 181, through the action of inverter 187, a low signal appears on lead 189. This low signal disables the AND gates 126-130, thus preventing the feed information stored in the pattern ROM 115 from being transmitted to the latch 137 and in its place, the information from the fixed feed code ROM 173 is transmitted to the latch 137. In the event that in the pattern address ROM 105 the two bits on the leads 169-171 indicate that the feed data stored in the pattern ROM 115 is to be utilized, the output of the OR 183 is low, providing a high signal on the lead 189 which allows the feed information from the pattern ROM 115 to be gated through to the latch 137. (When there is no feed override, the output of the OR gate 183 is similarly low).

The foregoing discussion has been concerned with what might be termed the "initialization" of the feed override function, that being setting up the forced feed. As was previously described, this resulted from the operator first touching the override enable area 90 and then touching either one of the arrows 62 or 63. At this time, as discussed above, the feed override function is enabled with a forced fixed feed substituted for the stored feed. In addition, the Touch Pad Selection Circuit 101 provides a four bit binary coded decimal (BCD) signal which is applied over the leads 191 to the feed override display 193, which causes the seven segment numeric display 61 to display a decimal digit between 0 and 9. The particular decimal digit which is displayed is an indication of the amount of reduction of the fixed feed. It is contemplated that either the same digit will be displayed, illustratively the digit 5, independent of the selected pattern or, alternatively, that the particular digit displayed will be dependent upon the selected pattern so that when the feed override function is initiated, the initial feed prior to operator adjustment thereof will be close to the programmed value.

As described above, the pattern address ROM 105 contains four additional bits for each pattern first word, two of the bits being presented on the leads 169 and 171 to the fixed feed code ROM 173. The other two bits are presented on the leads 195 and become the two most significant address bits for a feed override dity cycle code tables ROM 197. The other four bits of the six bit address to the ROM 197 are the BCD bits on the leads 191. The contents of the feed override duty cycle code tables ROM 197 are set forth in the table of FIG. 3. The two bits from the pattern address ROM 105 on the lead 195 determine which of the four sets is to be utilized and the four bits on the leads 191, the BCD equivalent of the displayed digit, determine which stored code within the selected set is outputed from the ROM 197 over the leads 199. FIG. 5 lists which of the four sets stored in the ROM 197 is selected for each of the patterns 21-49. By selectively touching either the decrement arrow 62 or the increment arrow 63, the operator can change the displayed numeral and select a desired override, which will provide either a reduced or amplified stitch length.

The five bit output from the ROM 197 on the leads 199 is presented as an input to a pulse width modulator 201. The pulse width modulator 201 is of the same type as the pulse width modulator 141 and provides an output signal over the lead 203 which is a high frequency digital signal having an ON/OFF duty cycle controlled by the binary number on the input leads 199, as is well known in the art. The duty cycle controlled signal on the lead 203 is applied to the gate electrode of a bilateral analog switch 205 which shunts feedback resistor 207 of operational amplifier 208 of preamplifier stage 153. This arrangement allows for the selective reduction of the gain of the preamplifier stage 153 in accordance with the duty cycle of the signal on the lead 203. When the switch 205 is open, the gain of the preamplifier stage 153 is determined, as is well known in the art, in accordance with the value of the feedback resistor 207. When the switch 205 is closed, the gain of the preamplifier stage 153 is substantially zero. Therefore, by pulse width modulating the switch 205 with an ON/OFF duty cycle controlled signal, the gain of the preamplifier stage 153 may be controlled. For example, if a signal were to be impressed upon the lead 203 so that the switch 205 was pulsed at a duty cycle of 25% ON and 75% OFF, the average gain of the preamplifier stage 153 would be 75% of its fixed gain. The pulse width modulated signal on the lead 203 is at a high frequency in comparison with the response time of the operational amplifier 208 and is illustratively on the order of 6 kilohertz, and the output of the preamplifier stage 153 passes through a filtering stage 155, so that the power amplifier 159 in effect sees a DC signal whose gain is dependent upon the duty cycle of the signal on the lead 203.

In a similar manner the stored stitch width, or bight, may be overridden by the operator first touching the override enable area 90 on the control panel 12 and then touching one of the width arrows 82 or 83. Upon the occurrence of these events, the Touch Pad Selection Circuit 101 provides a BCD signal on the leads 211 to the bight override display 213 and to the bight override duty cycle code table ROM 215. The contents of the bight override duty cycle code table ROM 215 are set forth in the table of FIG. 6. When the operator initially enables the bight override function, this function is initialized with an override digit of 9 which provides full stitch width. The operator can then decrease the stitch width by touching the decrement arrow 82 until a desired stitch width reduction is achieved, in accordance with the values set forth in FIG. 6. Of course, at any time the increment arrow 83 can also be touched to subsequently increase the stitch width up to the stored value. The selected reduction code from the bight override duty cycle code table ROM 215 is then applied over leads 217 as an input to a pulse width modulator 201' which provides a pulse width modulated duty cycle controlled signal on its output lead 203' to the bight actuator system 145' which functions in the same manner as previously described for the feed actuator system 145.

As an illustrative example, assume that the operator has selected the arrowhead pattern 43 and then initiates a feed override with a displayed digit 7 and a bight override with a displayed digit 5. From the table of FIG. 5, it is seen that for the arrowhead pattern 43 the forced fixed feed is number three and the stored feed reduction is from set one. From the table of FIG. 4 it is seen that the forced fixed feed number three provides 24.4 stitches per inch and from the table of FIG. 3, with seven being the digit displayed, from set one it is seen that this provides 71.9% of the fixed stitch length, or 33.9 stitches per inch. From the table of FIG. 6, it is seen that with a bight override display digit of five, this provides a sewn pattern at 62.5% of the programmed width.

Accordingly, there has been disclosed an arrangement for altering, under operator command, stored positional coordinates for successive stitch penetrations in a sewing machine equipped with a memory for storing such coordinates. It is understood that the abovedescribed arrangement is merely illustrative of the application of the principles of this invention. Numerous other arrangements may be devised by those skilled in the art without departing from the spirit and scope of this invention, as defined by the appended claims.

We claim:

1. In a sewing machine having stitch forming instrumentalities positionally controlled over a predetermined range between stitches to produce a pattern of feed and bight controlled stitches, static memory means for storing pattern stitch information, means operating in timed relation with said sewing machine for recovering selected pattern stitch information from said static memory means, separate actuating means responsive to said pattern stitch information for influencing the feed and bight motions respectively to produce a pattern of stitches corresponding to the selected pattern stitch information, and controllable alteration means effective to alter the operation of at least one of said feed and bight actuating means to an amount of motion proportional to that dictated by said pattern stitch information, the improvement comprising:

override memory means for storing actuating means motion alteration values in addressable memory locations;

operator controlled means for providing an address signal corresponding to a desired alteration value;

means utilizing said address signal for retrieving from said override memory means said desired alteration value; and converting means for converting said desired alteration value into a control signal for rendering effective said alteration means to proportionally alter the size of the selected pattern produced by said sewing machine.

2. A sewing machine in accordance with claim 1 wherein said override memory means storing feed alteration values includes a plurality of addressable tables of feed alteration values and said static memory means includes means for storing one of the table addresses associated with each of the stored patterns.

3. A sewing machine in accordance with claim 1 wherein the override memory means storing feed alteration values includes means for storing fixed forced feed information, and further including means for substituting said fixed forced feed information for the stored pattern feed information.

4. A sewing machine in accordance with claim 3 wherein said fixed forced feed storing means includes a plurality of addressable locations each storing a respective fixed forced feed value and said static memory means includes means for storing one of the fixed forced feed storing means addresses associated with each of the stored patterns.

5. A sewing machine comprising:

stitch forming instrumentalities positionally controlled over a predetermined range between stitches to produce a pattern of feed and bight controlled stitches;

static memory means for storing pattern stitch information;

pattern selection means including an address memory and responsive to operator pattern selection for providing a static memory means address corresponding to the selected pattern;

means operating in timed relation with said sewing machine for recovering selected pattern stitch information from said static memory means;

separate actuating means responsive to said pattern stitch information for influencing the feed and bight motions respectively to produce a pattern of stitches corresponding to the selected pattern stitch information;

separate controllable bight and feed alteration means effective to alter the operation of the feed and bight actuating means respectively to an amount of motion different from that dictated by said pattern stitch information;

bight override memory means for storing bight actuating means motion reduction values in addressable memory locations;

first operator controlled means for providing a bight override memory address signal corresponding to a desired bight reduction value;

first means utilizing said bight override memory address signal for retrieving from said bight override memory means said desired bight reduction value;

first converting means for converting said desired bight reduction value into a first control signal for rendering effective said bight alteration means;

feed override memory means for storing feed actuating means motion alteration values in addressable memory locations including;

a first feed override memory including a plurality of tables of feed alteration values, said pattern selection address memory further storing which of said tables corresponds to each of the patterns;

a second feed override memory storing fixed forced feed information in a plurality of addressable locations, said pattern selection address memory further storing one of the fixed forced feed memory addresses for each of the stored patterns;

second operator controlled means for providing a feed override memory address signal corresponding to a desired feed alteration value;

second means utilizing said feed override memory address signal and the information stored in said pattern selection address memory corresponding to the selected pattern for retrieving from said feed override memory means the desired feed alteration value from one of said tables in said first feed override memory and the fixed forced feed information from said second feed override memory;

means for substituting said fixed forced feed information for the stored pattern feed information; and second converting means for cnverting the desired feed alteration value into a second control signal for rendering effective said feed alteration means.

* * * * *